US008963361B2

(12) United States Patent
Falkenberg et al.

(10) Patent No.: US 8,963,361 B2
(45) Date of Patent: Feb. 24, 2015

(54) METHOD TO ROTATE THE ROTOR OF A WIND TURBINE AND MEANS TO USE IN THIS METHOD

(71) Applicant: Siemens Aktiengesellschaft, Munich (DE)

(72) Inventors: Peter Loevenskjold Falkenberg, Herning (DK); Karl Aage Maj, Hammel (DK); Jacob Blach Nielsen, Engesvang (DK); Henning Poulsen, Skjern (DK); Brian Rasmussen, Give (DK); Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 161 days.

(21) Appl. No.: 13/624,112

(22) Filed: Sep. 21, 2012

(65) Prior Publication Data
US 2013/0069373 A1 Mar. 21, 2013

(30) Foreign Application Priority Data

Sep. 21, 2011 (EP) .................................. 11182200

(51) Int. Cl.
*F03D 11/00* (2006.01)
*F03D 1/00* (2006.01)
*F03D 1/06* (2006.01)

(52) U.S. Cl.
CPC .............. *F03D 1/001* (2013.01); *F03D 1/0658* (2013.01); *F05B 2220/7066* (2013.01); *F05B 2230/60* (2013.01); *Y02E 10/721* (2013.01); *Y02E 10/725* (2013.01); *Y02E 10/728* (2013.01)

USPC ............................................................ 290/55

(58) Field of Classification Search
USPC ...................................................... 290/44, 55
See application file for complete search history.

(56) References Cited

U.S. PATENT DOCUMENTS

| | | | |
|---|---|---|---|
| 5,140,856 A * | 8/1992 | Larsen ............................ | 73/455 |
| 7,353,603 B2 | 4/2008 | Wobben | |
| 2004/0041409 A1 * | 3/2004 | Gabrys .......................... | 290/55 |
| 2006/0147308 A1 | 7/2006 | Wobben | |
| 2011/0138626 A1 | 6/2011 | Bagepalli et al. | |
| 2012/0073134 A1 * | 3/2012 | Bywaters et al. ............. | 29/889.1 |
| 2013/0243595 A1 * | 9/2013 | Falkenberg et al. ............ | 416/25 |

FOREIGN PATENT DOCUMENTS

| | | |
|---|---|---|
| DE | 102009013876 A1 | 9/2010 |
| EP | 1659286 A1 | 5/2006 |
| WO | WO 2010103086 A2 | 9/2010 |

* cited by examiner

*Primary Examiner* — Tho D Ta

(57) ABSTRACT

A direct driven wind turbine includes an electrical generator with a rotor and a stator, a hub constructed to receive a rotor blade, and an actuator device. The hub is connected to the rotor of the electrical generator. The hub and the rotor of the electrical generator are rotatable mounted in respect to the stator of the generator. The actuator device is constructed and arranged to rotate the rotor of the electrical generator and the hub of the wind turbine in respect to the stator of the electrical generator, wherein the actuator device is at least one motor.

9 Claims, 5 Drawing Sheets

METHOD TO ROTATE THE ROTOR OF A WIND TURBINE AND MEANS TO USE IN THIS METHOD

CROSS REFERENCE TO RELATED APPLICATIONS

This application claims priority of European Patent Office application No. 11182200.3 EP filed Sep. 21, 2011. All of the applications are incorporated by reference herein in their entirety.

FIELD OF INVENTION

The illustrated embodiments relate to a method to rotate the rotor of a wind turbine and to a device to be used in this method.

BACKGROUND OF INVENTION

A wind turbine transfers the energy of the wind into electrical energy. The wind turbine comprises a nacelle that is connected to a tower and a rotor that is connected to the nacelle. The rotor comprises a hub that is rotatable mounted to the nacelle and at least one rotor blade mounted to the hub.

The wind interacts with the rotor blade of the wind turbine in a way that the rotor rotates. The rotation of the rotor is transferred to an electrical generator.

When the wind turbine is erected, the tower is set up and the nacelle is mounted onto the tower. The hub is mounted to the nacelle and the at least one rotor blade is mounted to the hub.

The at least one rotor blade is hoisted up by a crane and connected to the hub. The hub has to be in a predetermined angular rotational position around his axis of rotation to establish the connection between the hub and the rotor blade.

This position corresponds to the direction of the blade during the fastening of the connection. The position can be a horizontal or a vertical arrangement of the hub and the rotor blade for example.

The hub has to be rotated to establish the connection between the hub and a first rotor blade. In the case of more then one rotor blade that has to be mounted, the position of the hub has to be changed. The hub has to be rotated from the first into a second position to establish the connection between the hub and the second rotor blade.

US 2006/0147308 A1 describes a method of mounting rotor blades to a rotor hub which is connected to a pod of a wind turbine power installation, including the following steps: rotating the rotor hub into a predetermined first position, fitting a rotor blade, rotation the rotor hub via the rotor blade into a predetermined second position, and mounting a second rotor blade, wherein the rotation of the rotor hub is effected in the direction of the effect of gravitational force of the first rotor blade which is already mounted.

This shows a disadvantage that there are no gravitational forces to support the rotation before the connection between the hub and the first rotor blade is established. Furthermore the gravitational force of a first rotor blade will support the rotation into a second position only for a part of the rotation. In a certain second part of the rotation the rotation needs to be performed against the gravitational forces of the first rotor blade. Thus the described method is not reliable enough to perform the rotation of the hub during the installation of the rotor blades.

SUMMARY OF INVENTION

It is desirable to provide an improved method and apparatus to rotate the hub of a wind turbine during the installation of the rotor blades.

The above is met by the features of the independent claim(s). Specific embodiments are described in the dependent claims.

A direct driven wind turbine comprises an electrical generator with a rotor and a stator, a hub constructed to receive a rotor blade and an actuator device. The hub is connected to the rotor of the electrical generator. The hub and the rotor of the electrical generator are rotatable mounted in respect to the stator of the generator. The actuator device is constructed and arranged to rotate the rotor of the electrical generator and the hub of the wind turbine in respect to the stator of the electrical generator, wherein the actuator device includes at least one motor.

In a direct drive wind turbine the rotor of the electrical generator is either connected directly to the hub of the wind turbine. Or it is connected via a shaft to the hub of the wind turbine.

The rotor blades are mounted to the hub during the erection of the wind turbine. Although most of the wind turbines comprise three rotor blades, wind turbines with one or two rotor blades are known.

The hub is connected to the rotor of the electrical generator and is rotatable together with the rotor. The actuator device is constructed and arranged to rotate the rotor of the electrical generator together with the hub of the wind turbine.

Thus the hub can be rotated by rotating the rotor of the electrical generator.

The actuator device includes at least one motor. Thus the rotation of the rotor of the electrical generator and the hub is performed by a motor in a controlled manner.

The motor is independent from other systems that are needed during the operation of the wind turbine. Thus the motor is optimized to the task of rotating the hub during the installation of the wind turbine.

Thus the rotation of the hub can be performed by this motor and no additional help is needed to perform the rotation. Thus no external help is needed like rotating the hub with a crane attached to one of the rotor blades.

A rotation by the help of a crane of other additional equipment is time consuming and expensive. Thus installation time and installation costs can be saved.

The actuator device can be disassembled after the installation of the turbine blades is completed. Thus the motor can be reused in another installation. Thus installation material is saved during the installation.

A rotation of the hub is necessary for the installation of the blades, but it can also be necessary before or after the installation of the blades. This can be during the installation of at least a segment of the generator, during maintenance and service, or for the dismantling of the wind turbine.

In one embodiment, the motor is attached to the stator of the electrical generator or a support structure carrying the stator of the electrical generator.

The stator of the electrical generator is mounted to a support structure that is designed to carry the electrical generator with the hub and the rotor blades. The support structure is then mounted to the tower of the wind turbine.

The motor for the rotation of the hub and the rotor is mounted to the stator of the electrical generator or the support structure carrying the stator. Thus the motor is connected to a part of the wind turbine that is not rotating with the hub and the rotor. Thus the connection to the motor, like an electrical connection, can be established to the motor without the difficulty that the motor is mounted to a moving part.

In one embodiment, the motor is acting on the rotor of the electrical generator to rotate the rotor of the electrical generator and the hub.

The motor is attached to the stator or the support structure of the stator. The motor can therefore be attached to the front end of the generator, which is the end pointing to the hub, or the rear end, which is pointing away from the hub.

The motor can act on the rotor of the electrical generator on the front end or on the rear end of the generator. As the rotor of the electrical generator is rotating together with the hub, the hub can be rotated by rotating the rotor of the electrical generator.

The diameter of the electrical generator is quite large. When the motor is placed at the stator and acts on the rotor this can be done at a certain predetermined radius of the electrical generator. Due to the lever principle the power of the motor needed is less at a larger radius then at a smaller radius.

Thus the power of the motor and so also the motor can be minimized.

The stator and the rotor of the electrical generator are quite close together. Thus the motor is mounted to the stator or the support structure of the stator and acts on the rotor with reaching over a short distance only. Thus no additional construction to transfer the force of the motor from its fixing point to a point where the force acts is needed.

In one embodiment, the electrical generator may comprise a brake-disc, that is attached to the rotor of the electrical generator and is prepared to be used to brake the rotation of the rotor, and the motor is acting on the brake-disc of the electrical generator.

The rotor of the electrical generator comprises a brake-disc, that is used to brake the rotation of the rotor. This brake-disc is arranged either on the front end of the rotor, so hub sided, or on the rear end of the generator, pointing away form the hub.

The brake-disc is very rigid and can be used to brake and lock the rotor of the wind turbine. Thus the brake-disc is rigid enough to be used to rotate the rotor of the electrical generator with the hub and the rotor blades that are attached to the hub.

Brake calibers are used at the brake disk to brake the rotor of the generator. During normal operation of the wind turbine the brake-disc moves between the opened calibers of the brake when the rotor rotates. The rim of the brake disk is easily accessible between one set of calibers and another set of calibers. Thus the rim of the brake-disc is very easy accessible. Thus is can be used to attach an actuator motor to rotate the rotor of the electrical generator.

The calibers acting on the brake-disk are mounted to the stator of the electrical generator or to the support structure carrying the stator. Thus a good possibility to mount the actuator motor to the stator or the support structure is provided, when the actuator motor is mounted in the neighborhood of the calibers.

Thus no additional mechanical construction is needed to connect the actuator motor with the stator or the support structure. Thus material and installation time is saved.

In one embodiment, the brake-disc may comprise a toothed rim to interact with a pinion or a belt.

A connection between a pinion or a toothed belt and a toothed rim provides a better power transmission then a normal friction drive. Thus the power transmission is improved. Thus the motor can rotate the rotor also when there is an imbalance due to a rotor blade that is already mounted to the hub.

Thus also safety is improved, as the imbalance is supported by a drive with a higher power transmission.

In one embodiment the motor may act on the hub of the wind turbine to rotate the hub of the wind turbine, thus the rotor of the electrical generator is rotated via the hub-rotation.

The motor is attached to the hub side of the stator of the electrical generator or the support structure carrying the stator. The rotor and the stator of the electrical generator are connected via a bearing at the hub side of the generator. The hub is connected to the rotor of the electrical generator close to the bearing. Thus there is a very short distance between the stator and the rotor at the hub side of the generator.

Thus the actuator motor can be attached to the stator and act on the hub. The transition zone from the generator to the hub is good accessible and free of fixed installation. Thus there is enough space to attach the motor to turn the hub during the installation of the blades.

In one embodiment, the hub comprises a toothed rim to interact with the motor.

A connection between a pinion or a toothed belt of the motor and a toothed rim provides a better power transmission then a normal friction drive. Thus the power transmission is improved. Thus the motor can rotate the rotor also when there is an imbalance due to a rotor blade that is already mounted to the hub.

Thus also safety is improved, as the imbalance is supported by a drive with a higher power transmission.

In one embodiment, the toothed rim may be provided within the outer boundaries of the hub.

Within the boundaries of the hub is the same as inside the hub or within the housing of the hub. Thus the toothed rim is inside of the housing of the hub. Thus the rim is protected form the external weather conditions.

Thus the conditions for the motor and the rim are constant and do not depend on the weather. Thus the drive will not get wet during rain and the lubrication will keep a constant temperature. Thus also the characteristics of the drive, like the friction for example, stay the same.

In one embodiment, the motor comprises a gear.

Thus the speed and the power of the motor are converted with the gear. Thus the power and speed of the motor can be optimized.

In one embodiment, the gear comprises a belt, a chain, a pinion wheel, a cyclo gear or a slew drive.

With a chain drive or a belt drive the motor can be attached to the stator or support structure with a certain distance to the rotor or the hub. The power is transferred with the chain or belt to the hub or the rotor. Thus the location of the motor can be in a certain distance to the rotor or hub, and the length of the chain or belt is set accordingly.

A pinion wheel interacts with the toothed rim of the brake-disc or the hub. Thus the rotation of the motor can be transferred from the motor to the toothed rim.

In one embodiment, the motor is controlled by a controller or a control system.

Thus the operation of the motor can be controlled. For the installation of rotor blades at the hub the hub needs to be positioned correctly. By the use of a controller the rotation of the hub can be started and stopped precisely. Thus the position of the hub can be controlled precisely.

In one embodiment, the controller may be the controller of the wind turbine.

The wind turbine comprises a controller. Thus controller can also be used to control the motor used for the rotation of the hub. Thus no additional controller is needed. Thus material and installation time is saved.

In one embodiment, the control system is a controller separate from the turbine controller.

During the installation of the wind turbine the controller of the wind turbine might not yet be installed or the controller is not yet connected to electrical power.

Thus an independent controller can be used. Thus the controller is already set up and programmed to control the motor. Thus the controller of the wind turbine does not need to be programmed to control the motor. Thus additional time or additional memory capacity is saved.

Method to mount a rotor blade to a hub of a direct driven wind turbine, which is configured according to one of the preceding claims, comprising the steps of:

turning the hub into a predetermined position around the axis of rotation of the rotor of the electrical generator by the use of the actuator device, whereby the actuator device are constructed and arranged to rotate the rotor of the electrical generator and the hub of the wind turbine in respect to the stator of the electrical generator, and mounting a rotor blade to the hub.

To install a rotor blade at a hub the rotor blade is lifted up by the help of a crane. The crane is equipped with a special tool to bear the rotor blade. To attach the rotor blade to the hub the hub needs to be in a special predetermined position. Thus the area at the hub, where the first rotor blade will be attached is in a certain predetermined position relative to the first rotor blade. For this the hub is rotated into this certain predetermined position before the rotor blade can be attached.

For the installation of a second rotor blade the hub is rotated into a second predetermined position. In this second position the area at the hub where the second rotor blade will be attached is in a certain predetermined position relative to the second rotor blade. The first predetermined position for the first rotor blade is the same as the second predetermined position.

Thus the second rotor blade can be attached in the same position. Thus the position of the crane is the same the at the first rotor blade.

Thus the crane can stay at the same place during the installation of the rotor blades. Thus the time for setting up the crane in a different position for different rotor blades is saved.

BRIEF DESCRIPTION OF THE DRAWINGS

Embodiments are illustrated in more detail by help of figures.

The figures show an example configuration and are not meant to be limiting.

DETAILED DESCRIPTION OF INVENTION

Figure 1:
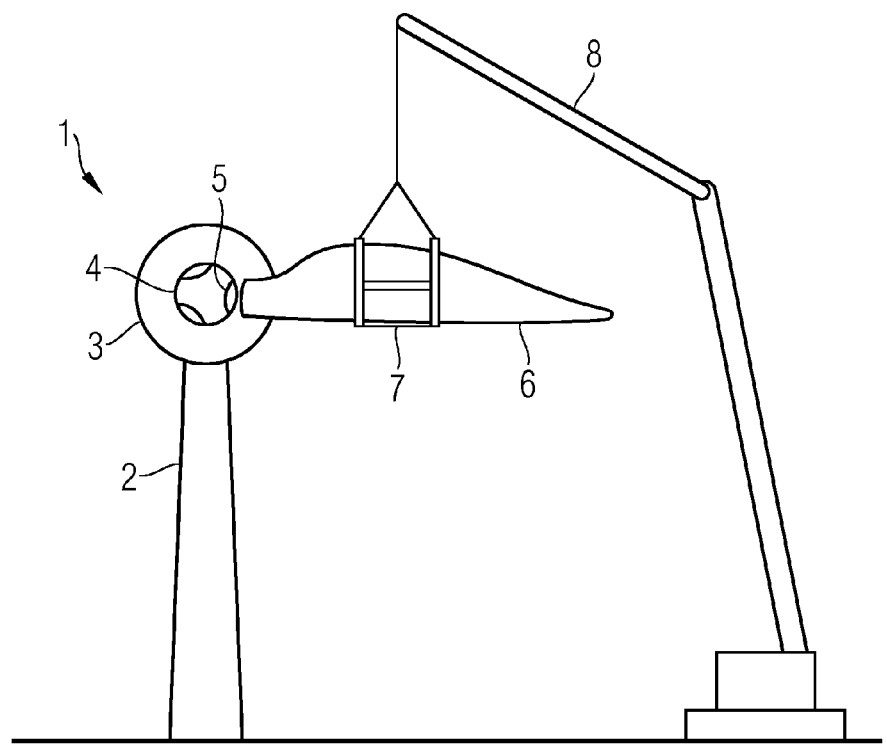
FIG. 1 shows the installation of a rotor blade at a wind turbine.

FIG. 1 shows the installation of a rotor blade at a wind turbine.

The direct driven wind turbine 1 comprises a tower 2, a generator 3 and a hub 4. The hub 4 comprises at least one place 5 where a rotor blade 6 is attached.

The rotor blade 6 is held by a lifting device 7 and is lifted by a crane 8. To attach the rotor blade 6 at the place 5 at the hub 4, the hub 4 needs to be turned in a certain predetermined position.

For the installation of a second rotor blade the hub has to be turned into a second position. By turning the hub into the predetermined positions the crane 8 can stay at the same place during the installation of all rotor blades 6.

Figure 2:
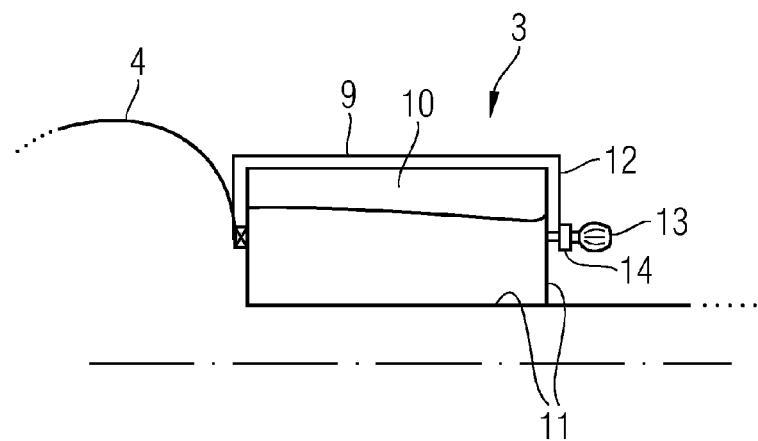
FIG. 2 shows the principle of a motor acting on the brake-disc.

FIG. 2 shows the principle of a motor acting on the brake-disc.

FIG. 2 shows a cut through a generator 3 and a hub 4 of a direct driven wind turbine. The generator comprises a rotor 9 and a stator 10. The stator 10 is mounted to a support structure 11.

At the end of the rotor 9 of the generator 3, that is pointing away from the hub 4, is a brake-disc 12 attached to the rotor 9.

A motor 13 is attached to the support structure 11. The motor 13 comprises a gear wheel 14 that is acting on the brake-disc 12.

By activating the motor 13 the gear wheel 14 turns the rotor 9 and the hub 4 of the wind turbine.

Figure 3:
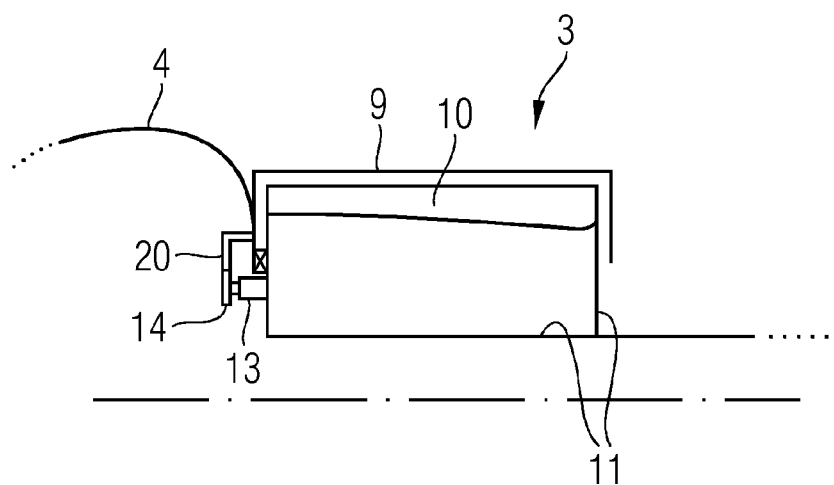
FIG. 3 shows the principle of a motor acting on the hub.

FIG. 3 shows the principle of a motor acting on the hub.

FIG. 3 shows a cut through a generator 3 and a hub 4 of a direct driven wind turbine. The generator comprises a rotor 9 and a stator 10. The stator 10 is mounted to a support structure 11.

A motor 13 is attached to the support structure 11 at the side of the generator 3 that is pointing toward the hub 4. The motor 13 comprises a gear wheel 14. The hub 4 comprises a toothed rim 20 and the gear wheel 14 is acting on the toothed rim 20.

By activating the motor 13 the gear wheel 14 turns the hub 3 and the rotor 9 of the wind turbine.

Figure 4:
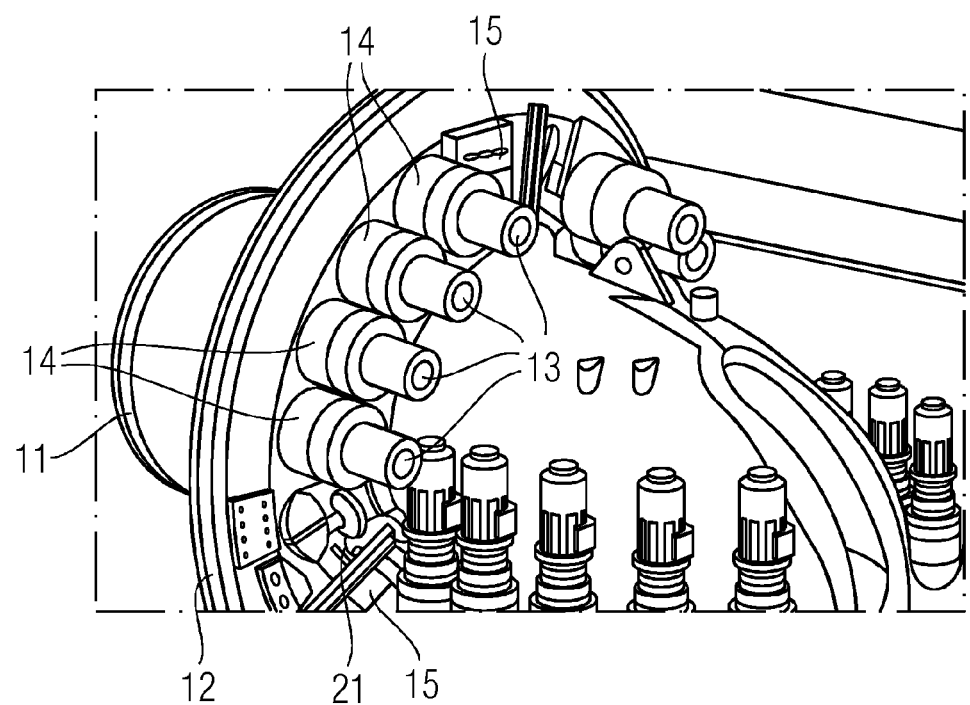
FIG. 4 shows the motors attached to rotate the rotor.

FIG. 4 shows motors attached to rotate a rotor.

The motors 13 are connected to a support structure 11. The stator of the generator (not shown) will also be connected to this support structure 11.

The motors are arranged to interact with a brake-disc 12 of a rotor of the generator.

The motors 13 are arranged along a rim of the brake-disc 12 in the space between two of the calibers 15 of the brake of the wind turbine. The motors 13 are interacting with a predetermined area 21 of the brake-disc.

The motors 13 can be attached for the installation of rotor blades and can be detached after the installation is finished. The motors can then be used in another wind turbine for the installation of the blades.

The motors 13 are equipped with a gear 14 that transfers the speed and the power of the motor 13.

Figure 5:
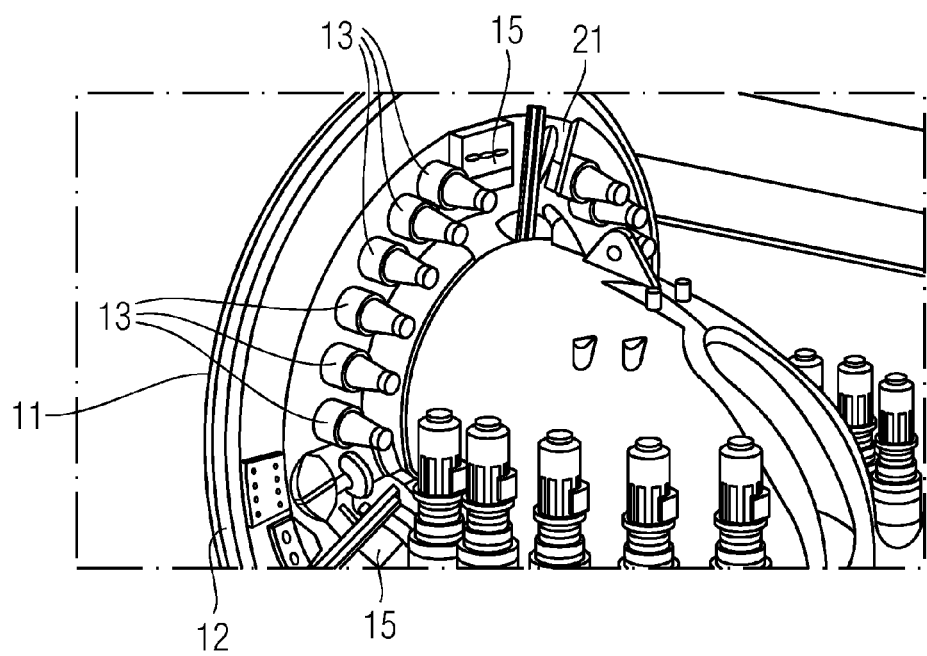
FIG. 5 shows a different type of motors attached to rotate the rotor.

FIG. 5 shows a different type of motor attached to rotate a rotor.

FIG. 5 shows a different type of motor 13 attached to a support structure 11. The support structure 11 caries the stator (not shown) of the generator. The motors are interacting with an area 21 of a brake-disc 12.

The motors 13 are located between two sets of calibers 15 that act on the brake-disc 12.

Figure 6:
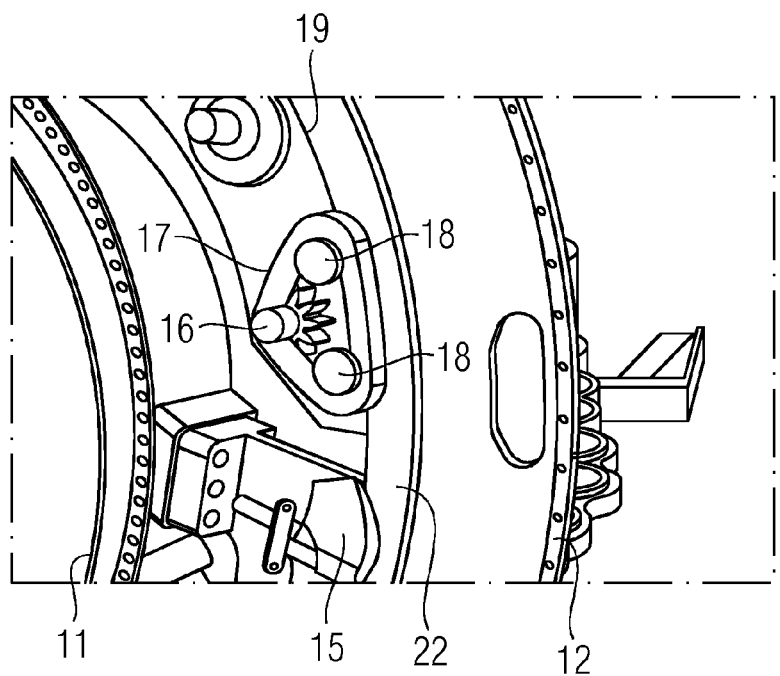
FIG. 6 shows a detail of a motor with a chain drive.

FIG. 6 shows a detail of a motor with a chain drive.

FIG. 6 shows a chain drive of a motor acting on a brake-disc 12. A chain wheel 16 is connected to the motor and the chain 17 is interacting with the chain wheel 16 and the two gear wheels 18. The gear wheels 18 are attached to a support structure 11. The chain 17 and the gear wheels 18 are acting on the toothed rim 19 of the brake-disc 12. The brake-disc 12 shows an area 22. The calibers 15 of the brake use the area 22 to brake the wind turbine.

The motor is connected to the support structure 11 of the wind turbine.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A direct driven wind turbine, comprising:
an electrical generator having a rotor and a stator, a hub constructed to receive a rotor blade, and an actuator device,
wherein the hub is connected to the rotor of the electrical generator,
wherein the hub and the rotor of the electrical generator are rotatably mounted with respect to the stator of the generator,
wherein the actuator device includes a motor, and is constructed and arranged to rotate the rotor and the hub in respect to the stator of the electrical generator, and
wherein the electrical generator further comprises a brake-disc attached to the rotor for braking the rotation of the rotor, wherein the motor is operable to act on the brake-disc, wherein the brake-disc includes a toothed rim, and the motor includes a geared wheel operably configured to interact with the toothed rim, such that the rotation of the motor is transferred from the motor to the toothed rim.

2. The direct driven wind turbine according to claim 1, wherein the motor is attached to the stator of the electrical generator or to a support structure carrying the stator of the electrical generator.

3. The direct driven wind turbine according to claim 1, wherein the motor is configured to operate independent of systems required to operated the direct driven wind turbine.

4. A method for mounting a rotor blade to a hub of a direct driven wind turbine according to claim 1, the method comprising:
turning the hub into a predetermined position around the axis of rotation of the rotor of the electrical generator by the use of the actuator device, whereby the actuator device is constructed and arranged to rotate the rotor of the electrical generator and the hub of the wind turbine in respect to the stator of the electrical generator, and
mounting a rotor blade to the hub.

5. The direct driven wind turbine according to claim 1, wherein the motor comprises a gear.

6. The direct driven wind turbine according to claim 5, wherein the gear comprises a belt, or a chain, or a pinion wheel, or a cyclo gear or a slew drive.

7. The direct driven wind turbine according to claim 1, wherein the motor is controlled by a controller or a control system.

8. The direct driven wind turbine according to claim 7, wherein the controller is the controller of the wind turbine.

9. The direct driven wind turbine according to claim 7, wherein the control system is a controller separate from the turbine controller.

* * * * *